United States Patent
Citro et al.

(10) Patent No.: US 11,333,133 B2
(45) Date of Patent: May 17, 2022

(54) LINEAR ACTUATOR COMPRISING A SHAPE MEMORY ALLOY COIL SPRING OPERATING AT LOW ELECTRICAL POWER

(71) Applicant: SAES GETTERS S.P.A., Lainate MI (IT)

(72) Inventors: Marco Citro, Varese VA (IT); Luca Fumagalli, Muggiò MB (IT); Matteo Zanella, Olgiate Olona VA (IT); Michele Scarlata, Caronno Pertusella VA (IT)

(73) Assignee: SAES GETTERS S.P.A., Lainate MI (IT)

(*) Notice: Subject to any disclaimer, the term of this patent is extended or adjusted under 35 U.S.C. 154(b) by 0 days.

(21) Appl. No.: 17/426,664

(22) PCT Filed: Mar. 27, 2020

(86) PCT No.: PCT/EP2020/058864
§ 371 (c)(1),
(2) Date: Jul. 29, 2021

(87) PCT Pub. No.: WO2020/201164
PCT Pub. Date: Oct. 8, 2020

(65) Prior Publication Data
US 2022/0042498 A1    Feb. 10, 2022

(30) Foreign Application Priority Data
Mar. 29, 2019    (IT) .................. 102019000004715

(51) Int. Cl.
F03G 7/06    (2006.01)

(52) U.S. Cl.
CPC ....... *F03G 7/06145* (2021.08); *F03G 7/0616* (2021.08)

(58) Field of Classification Search
CPC ....................................................... F03G 7/065
(Continued)

(56) References Cited

U.S. PATENT DOCUMENTS

| | | | | |
|---|---|---|---|---|
| 4,801,279 A | * | 1/1989 | Nakanishi | H01R 4/01 439/877 |
| 4,846,729 A | * | 7/1989 | Hikami | H01R 12/856 439/161 |

(Continued)

FOREIGN PATENT DOCUMENTS

| | | | |
|---|---|---|---|
| JP | 02197782 A | * | 8/1990 |
| WO | WO-2008088197 A1 | | 7/2008 |

OTHER PUBLICATIONS

English Translation JP-02197782-A (Year: 1990).*
International Search Report and Written Opinion dated Jun. 25, 2020 in PCT/EP2020/058864, 12 pages.

*Primary Examiner* — Shafiq Mian
(74) *Attorney, Agent, or Firm* — Element IP, PLC

(57) ABSTRACT

The present invention relates to linear actuators comprising an electrically-controlled shape memory alloy coil spring (23) suitable to provide linear displacements in valves, switches, lock systems and provided with a crimped terminal at each extremity, each of said crimped terminals comprising a crimping component (21) and an engaging member (22) suitable to mount the spring (23) into the linear actuator. The invention further discloses the use of said spring (23) with particular geometrical characteristics and crimping system assuring the maximization of the available stroke and fatigue life, structural simplicity, low electrical power requirements and thermal inertia, small size.

11 Claims, 3 Drawing Sheets

(58) Field of Classification Search
USPC .................................................. 60/526–527
See application file for complete search history.

(56) References Cited

U.S. PATENT DOCUMENTS

| | | | |
|---|---|---|---|
| 2006/0207250 A1* | 9/2006 | Komori | F03G 7/065 60/527 |
| 2011/0083325 A1* | 4/2011 | Foley | C21D 9/02 29/896.9 |
| 2014/0007571 A1* | 1/2014 | Jee | F03G 7/065 60/527 |
| 2015/0073318 A1* | 3/2015 | Holschuh | B64G 6/00 601/84 |
| 2018/0313346 A1* | 11/2018 | Oakes | F04B 43/043 |
| 2019/0288391 A1* | 9/2019 | Jaime | F03G 6/065 |

* cited by examiner

LINEAR ACTUATOR COMPRISING A SHAPE MEMORY ALLOY COIL SPRING OPERATING AT LOW ELECTRICAL POWER

The present invention relates to actuators comprising an electrically-controlled shape memory alloy coil spring suitable to control linear displacements in valves, switches, lock systems, etc. and requiring low voltage and current.

Actuators are well known in a variety of industrial applications such as wastewater treatment plants, power plants, manufacturing plants and refineries, as well as in certain consumer or residential devices such as white goods. They can be coupled to so-called uni-stability or multi-stability mechanisms in order to assist with actuator assembly applications, referring respectively to the ability of an object to have one or multiple (two or more) stable states. Little or no energy is required to maintain an object in any one of the stable states (e.g. two states of a bistable object), however activation energy is required for the object to be displaced from a stable state (e.g. switching between the two given stable states).

The most commonly used type of apparatus for actuator-induced movement is a solenoid, which is a device suitable to convert energy into a linear displacement of a movable element. An electromechanical solenoid typically comprises electrically conductive windings that are wrapped around a magnetic core such that the windings produce a magnetic field when an electrical current is passed through them, thereby inducing the magnetic core to move axially. The movable element is coupled to the magnetic core so that it can be actuated for obtaining a linear displacement, exemplary applications being the actuation of a valve, a switch or a lock system for doors in white goods.

A common limitation with regards to electromechanical solenoids, particularly but not only when they are used in small or portable consumer applications, is the fact that they have large power requirements. In fact, solenoids require a costly and complex source of power for operation, since they must be equipped with AC to DC power converters or expensive varieties of batteries in a "series" configuration.

Further drawbacks of solenoids reside in the fact that they generate heat and create external magnetic fields which may affect the other components in the actuator or the device, and also that precision control may result difficult and their response time is longer than the desired one.

In the last decades, replacement of solenoids with components comprising Shape Memory Alloy (SMA) materials have been done. SMA materials have a first, relaxed (martensite) state at ambient temperature and a second, fully-actuated (austenite) state when heated to a predetermined temperature. Components made of SMA materials are commercially available in several shapes and structures: wire, rod, coil spring, sheet are popular examples. Several attempts have been made to replace solenoids in linear actuators with these SMA components that in the actuation field are subjected to electrical control, rather than being responsive to ambient temperature.

U.S. Pat. No. 5,211,371 discloses a linearly actuated valve in which the seal is movable with respect to the body between closed and open positions by operation of a SMA wire biased by a non-SMA spring. The simple configuration disclosed by U.S. Pat. No. 5,211,371, consisting in the use of a straight SMA wire, is characterized by a limited stroke, i.e. the displacement of the movable part of the actuator results too small to be used in many applications.

In fact, some attempts to improve the stroke obtained by the use of SMA components have been described in some publications.

U.S. Pat. No. 9,027,903 discloses an actuator where the SMA wire is used in combination with three pulleys. The pulley arrangement is necessary to reduce the form factor requirements of the assembly: "snaking" the filament back and forth within the assembly from pulley to pulley allows to improve the displacement of the movable part (i.e. the effective stroke) about four times that of a single straight run of wire. It is clear that solutions like this make the structure of the actuator more complex and cannot always be used if there are strong limitations in arranging them inside the actuator.

Notwithstanding the above-described limitations, wires have been the most exploited SMA components driven by electrical supply in linear actuators, especially if compared to coil springs. In fact, SMA springs are commonly used as members responding to ambient temperature and not to electric current, because they may be susceptible to temperature gradients which can deform the coiled shape if portions of the SMA spring do not attain the proper temperature for phase transformation. Moreover coil-shaped SMA components do not have a recovering force as great and homogenous as linearly-shaped ones: in fact the recovering force of the spring is maximum only at its surface and weakens toward the center.

U.S. Pat. No. 5,816,306 discloses a shape memory alloy actuator for a venetian blind mechanism including at least one SMA spring but is silent on how the above-referred limits related to their use by electric current can be overcome.

US 2015/0073318 discloses an active compression garment including a shape memory alloy (SMA) linear actuator member configured to apply compression to, or remove compression from, the body part of interest based on the presence or absence of an applied electrical stimulus. The linear actuator member comprises SMA coil springs with a ratio between the external diameter of the coil spring and the thickness of the coiled wire of 4.08, but is silent on how said springs are connected to the actuator unit and to the driven element.

The object of the present invention is to overcome the drawbacks of SMA components in linear actuators described in the prior art, assuring the maximization of the available stroke and the number of life cycles, structural simplicity, low electrical power requirements and thermic inertia, small size that provides the possibility to be universally applied.

The invention will be illustrated with the help of the following figures.

In the above-referenced figures only the essential elements for understanding the invention have been illustrated, ancillary components such as a current supply source have not been shown since they are ordinary means known in the technical field. Moreover, element dimensions and dimensional ratios in some cases have been altered to improve their readability, with particular but not exclusive reference to the SMA wire diameter.

The invention is not limited to any specific shape memory alloy material, even though preferred are Ni—Ti based alloys, such as the alloy commonly known with the trade name of Nitinol, whose basic properties are described in U.S. Pat. No. 4,830,262. The newer and improved shape memory alloys described in U.S. Pat. Nos. 8,152,941 and 8,430,981 in the name of SAES Smart Materials may also be employed.

In particular the term Ni—Ti based shape memory alloy encompasses shape memory alloys with a preponderant content of nickel and titanium (at least 60 atomic percent, at %), as additional elements may impart different properties such as lower hysteresis in case of Ni—Ti—Cu alloys, described for example in U.S. Pat. No. 4,565,589, or higher transformation temperature as in the case of Ni—Ti—Hf alloys, described for example in U.S. Pat. No. 5,114,504.

The present invention consists in a linear actuator comprising a SMA coil spring with particular geometrical characteristics and means for connecting to the driven element. In fact, the inventors have found that a coil spring having the ratio ($\Phi$) between the external diameter (D) of the coil spring and the thickness (T) of the coiled wire comprised between 4 and 10 can be advantageously used in linear actuators when its terminal portions are crimped in a novel way suitable to improve the number of life cycles If ratio $\Phi$ is lower than 4 the spring has been found unsuitable to achieve the desired stroke and actuation speed because the wire is too thick and has a high thermal inertia, whereas when this ratio is higher than 10 the low strength of the spring limits the advantages of the spring for solenoid replacement because the wire is too thin to provide an adequate force.

Figure 1:
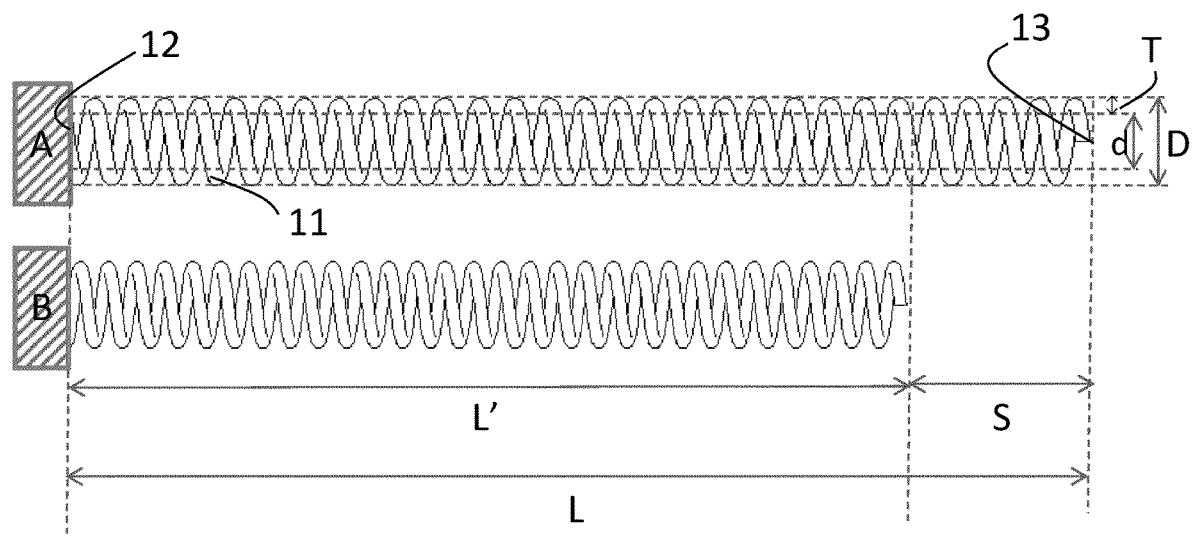
FIG. 1 shows a schematic representation of a spring according to the present invention and of its working from the unactuated to the actuated state.

FIG. 1 schematically represents a spring 11 according to the present invention, which is formed by a SMA wire having thickness T which is coiled in such a way that the coil spring 11, with extremities 12 and 13, has an external diameter D, an internal diameter d and a length L when it is in its unactuated state A. For clarity purposes, it is important to note that external diameter D and thickness T can be measured from the section of the spring and of the coiled wire respectively. Because both spring 11 and its constituting coiled wire may have cross sections not exactly circular, for the purpose of the present invention external diameter D and thickness T can be considered as the diameter of the smallest circle that can circumscribe said cross sections.

The comparison between the unactuated state A and the actuated state B of FIG. 1 schematically shows how spring 11 can work in association with a bias load (not shown) when electrical power is supplied at its extremities 12 and 13, such that spring 11 goes to its actuated state B and its length decreases to L' providing a stroke S defined as L-L'. The use of spring 11 according to the present invention allows to achieve strokes many times higher than an uncoiled wire, usually between 2 and 12 times.

The external diameter D is preferably comprised between 0.1 and 10 mm, the wire thickness T is preferably comprised between 0.025 and 1 mm and the number of turns of spring 11 is preferably comprised between 2 and 240. The coiled SMA wire used to manufacture the spring can be optionally coated with a different material, for example polyurethane, silicone, metal, lacquer, paint, microencapsulated phase change material. In this case, for the measurement of the external diameter D and wire thickness T the coating contribution to the respective sections of the spring and wire must not be considered, i.e. the sections have to be evaluated with reference to their core made of SMA material.

Figure 2:
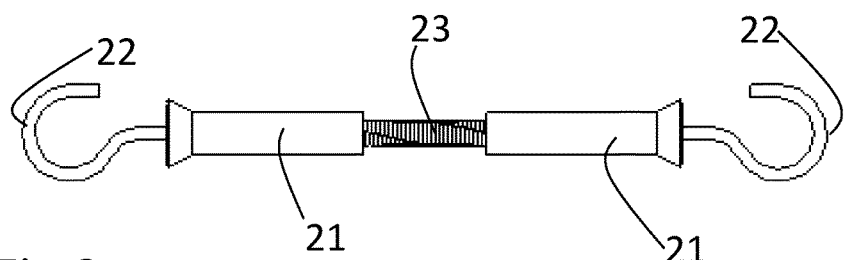
FIG. 2 shows a spring with crimped terminals according to the present invention.
Figure 3:
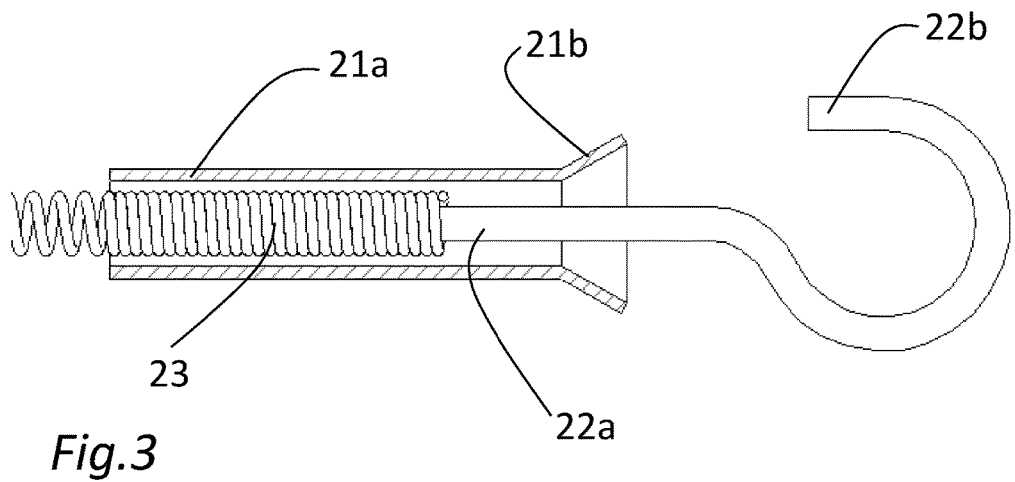
FIG. 3 shows an enlarged longitudinal sectional view of a crimped terminal of FIG. 2.

As the main technical feature of the present invention, shown in FIGS. 2 and 3, the spring is used with crimped terminals at its extremities, each terminal comprising a crimping component 21 and an engaging member 22 connected to spring 23 by said crimping component 21, which is made of a ductile material (e.g. brass, aluminum, copper) suitable to be properly deformed and is shown in the figure still in its undeformed shape.

FIG. 3 shows an enlarged longitudinal cross-section of a crimped terminal of FIG. 2 wherein the crimping component 21 has a tubular body 21a optionally provided with a conical flaring 21b at its distal end toward the engaging member 22, which has a connection portion 22a, usually with a rod-like linear shape, and a fitting portion 22b with a hook shape for engagement with corresponding engagement means provided in the linear actuator. The conical flaring could optionally be positioned also at the proximal end, i.e. toward the spring to simplify the insertion of the latter. Moreover the tubular body could be obtained from a tube or a metal strip properly pre-deformed with a tubular shape but with no structural continuity. To properly retain and use spring 23, the engaging member 22 acts as an inner part of the crimped terminal and the crimping component 21 acts as an outer part thereof, differently from conventional crimping systems in which the fitting portion is formed on the crimping component 21, i.e. there is no separate engaging member 22.

More specifically, the diameter of the connection portion 22a of the inner part is substantially equal to the inner diameter d of spring 23, while the internal diameter of the tubular body 21a of the outer part is equal to or greater than the outer diameter D of spring 23. The outer part (crimping component 21) properly deformed and crimped both on the terminal portion of spring 23 and on the inner part (engaging member 22) allows the overall system to be handled and used without relative movements among its parts, with the inner part being responsible to keep spring 23 undeformed only in correspondence with the outer part. To this purpose, the inner part is usually made of a material that must be harder than the outer part, such as steel, although also the outer part could be made of steel if its thickness allows the required deformation (even if softer materials are preferable).

Figure 4A:
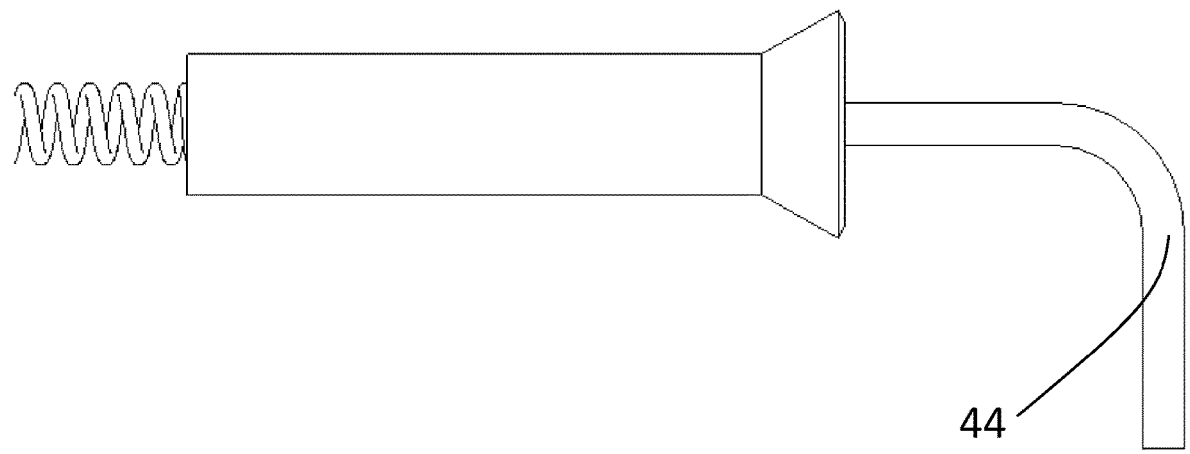
FIGS. 4a to 4d show alternative crimped terminals for springs according to the present invention.
Figure 4B:
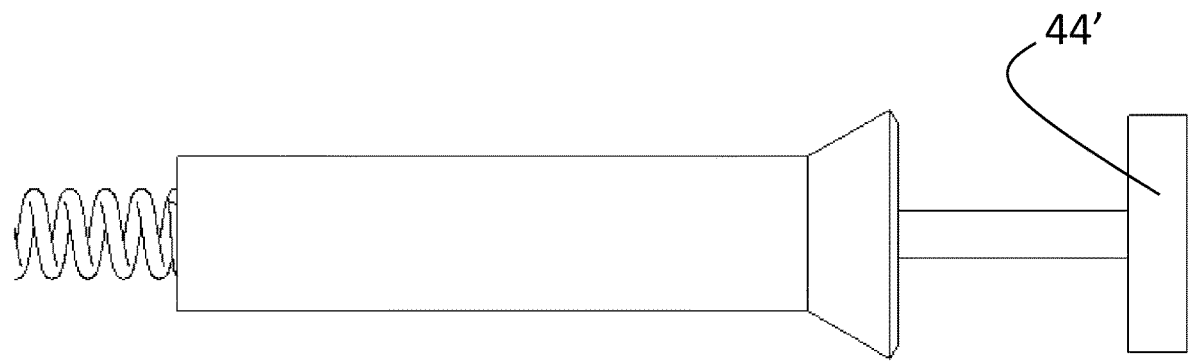
Figure 4C:
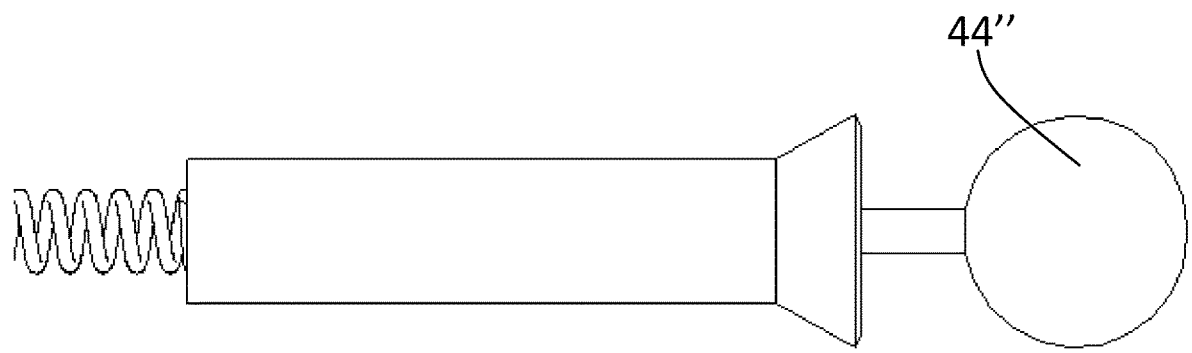
Figure 4D:
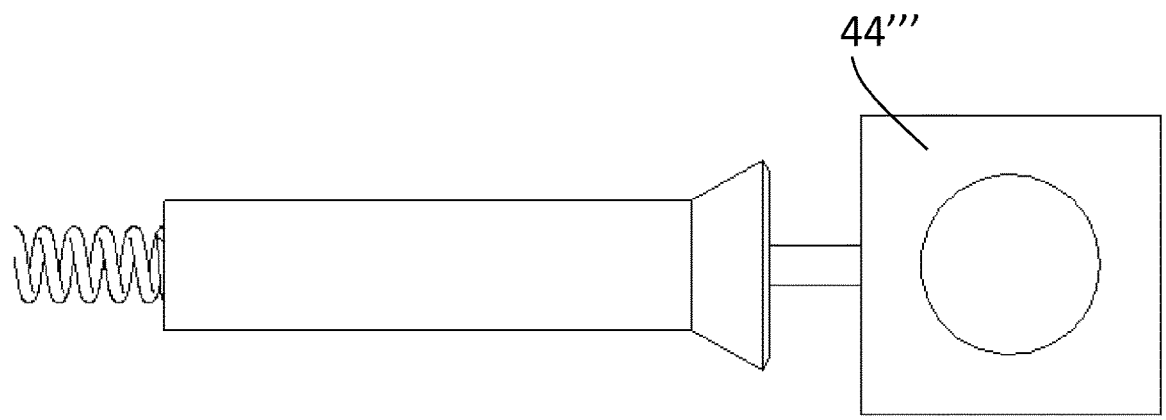

As mentioned above, the hook-shaped engaging member 22 is suitable to facilitate the mounting of spring 23 into a linear actuator of a device that is provided with corresponding engagement means, and similarly FIGS. 4a to 4d show some alternative shapes for the crimped terminals that comprise an engaging member wherein the fitting portion has an "L" shape 44 as in FIG. 4a, a nail shape 44' as in FIG. 4b, a spherical shape 44" as in FIG. 4c or a holed square shape 44'" as in FIG. 4d.

Even if in the above description the working principle of the present invention has been explained with reference to a linear configuration of the spring, in a second possible embodiment (not shown in the drawings) said spring can be mounted in the final device resulting in a "V" shape or a "U" shape. In these alternatives, the linear displacement of a moving element is assured by its connection to the middle portion of the spring rather than to one of its extremities.

The comparison between a wire and a spring suitable to give evidence of the advantage of the spring according to the invention for wire or solenoid replacement in linear actuators by use of a low electrical power supply can be carried out by setting the same working force and the same installation length, and feeding the proper current to actuate both the straight wire and the coil spring. A dedicated testing equipment has been used, composed by a very stiff aluminum hyperstatic frame to guarantee a correct measurement of the wire/spring deformation since such frame allows to keep restrained the SMA element (wire and spring) and to feed current thereto, as well as to load it with a constant load or a bias spring.

Thanks to an internally designed electronics, such testing equipment allows the measurement of different parameters for a SMA element such as the stroke, the feeding current, the actuation time, the number of cycles for the fatigue characterization. The stroke is measured by using a laser, and it can be verified that the stroke obtained with a spring according to the present invention is up to the 12% of its length whereas a wire assures values limited to about 3%.

A similar approach was used for the comparison between a linear solenoid and a SMA spring according to the present invention, by starting from the performance of the linear solenoid and then designing a SMA spring that can perform the same mechanical work. The previous testing equipment has been modified in order to allow the solenoid feeding so as to guarantee the proper feeding both of the linear solenoid (12V) and of the SMA spring (variable depending on its length), and thus measure the real feeding current, the voltage powering the SMA spring and the actuation time. The mechanical work is obtained by imposing a steady force to the moving part of the solenoid and powering the device at 12 V, with two end stoppers which impose the same stroke that is equal to the distance between them, whereby the product of the force by the stroke is the mechanical work.

The comparison has been made on the weight and size of the two actuators and on the electrical power needed by them to perform the same mechanical function, with the result that a SMA coil spring can allow to obtain several advantages when compared to a solenoid. In fact, a significant reduction of weight and volume can be achieved, both by more than 90%, as well as a great reduction of the electrical power to be used for its actuation, namely more than 50% and up to 90% less than the power required by the solenoid.

Hereinafter, the invention will be explained in more detail with reference to the following non-limiting examples, with the aim to give evidence of the advantage of the spring crimped according to the invention in comparison with the commonly used crimping system.

The present crimping system includes a rigid part, which constitutes the non-deformable core, inserted inside the turns located at the two ends of the spring, such that said turns are compressed/constrained between the rigid core and an external tube made of deformable material. Traditional crimping causes deformation of the turns located at the ends of the spring with the consequence that, compared to the crimping system according to the invention, with the same load and stroke conditions, fatigue life is shorter.

Linear fatigue tests were conducted on stations whose set-up is as follows: a first end of the spring is anchored to the upper fixed part of the station structure, the second end is connected to a first end of the steel bias spring by means of a mechanical component that can only slide vertically with low friction and the second end of the steel bias spring is connected to the station's fixed structure. The mechanical component that connects the two springs has a cold stopper and allows to detect the stroke travelled by the spring thanks to a Hall sensor placed on the station structure that detects the magnetic field generated by a permanent magnet which is integral with the mechanical component. The activation of the spring takes place through an electrical impulse commensurate with the stroke and the load of the spring, the cooling time between operating cycles is strictly correlated to the mass of the spring.

A test was carried on two identical springs with 30 turns, a wire diameter of 0.13 mm and an internal diameter of 0.5 mm by applying 0.5 N of operating force and 4 mm of operating stroke. The spring with this crimping geometry (i.e. rigid internal core) was able to work for more than 100000 cycles, whereas for the spring crimped in the conventional way the fatigue life was shorter than 15000 cycles.

The use of a linear actuator comprising a SMA coil spring according to the present invention allows to obtain all the above advantages in several devices, for example locking devices, door closing switches or fluidic valves.

The invention claimed is:

1. A linear actuator, comprising:
   an electrically-controlled shape memory alloy coil spring that has an external diameter (D) and is made with a shape memory alloy coiled wire having a thickness (T), a ratio ($\Phi$) between said external diameter (D) and said wire thickness (T) being comprised between 4 and 10, wherein said coil spring is provided with a crimped terminal at each extremity, each of said crimped terminals comprising:
      a crimping component, that is deformed and crimped on a terminal portion of the coil spring, and
      a separate engaging member comprising
         a fitting portion configured to mount the coil spring into the linear actuator and
         a connection portion configured in size and material to be fitted in said terminal portion of the coil spring and to keep the coil spring undeformed when the terminal is crimped.

2. The linear actuator according to claim 1, wherein the external diameter (D) is comprised between 0.1 and 10 mm.

3. The linear actuator according to claim 1, wherein the wire thickness (T) is comprised between 0.025 and 1 mm.

4. The linear actuator according to claim 1, wherein said coil spring has a number of turns comprised between 2 and 240.

5. The linear actuator according to claim 1, wherein the crimping component comprises a tubular body having an internal diameter equal to or greater than the outer diameter (D) of the coil spring.

6. The linear actuator according to claim 5, wherein said tubular body is made by a tube or a pre-formed metal strip.

7. The linear actuator according to claim 5, wherein said tubular body is provided with a conical flaring at its distal end toward the engaging member and/or at its proximal end toward the coil springs.

8. The linear actuator according to claim 1, wherein the fitting portion has a hook shape, or an L shape, or a nail shape, or a spherical shape, or a square holed shape.

9. The linear actuator according to claim 1, wherein the shape memory alloy coiled wire is coated with a material selected from a polyurethane, a silicone, a metal, a lacquer, a paint, and a microencapsulated phase change material.

10. A device, comprising:
    a linear actuator according to claim 1, wherein it comprises a movable element that is connected to the engaging member at the extremity of the shape memory alloy coil spring.

11. The device according to claim 10, said device being a locking device, a door closing switch, or a fluidic valve.

* * * * *